United States Patent [19]

Evans et al.

[11] Patent Number: 4,675,366
[45] Date of Patent: Jun. 23, 1987

[54] ALKYL-CONTAINING MONOMERS IN CROSS-LINKABLE POLYIMIDE COMPOSITIONS

[75] Inventors: Thomas L. Evans; Marsha M. Grade, both of Schenectady, N.Y.

[73] Assignee: General Electric Company, Schenectady, N.Y.

[21] Appl. No.: 754,486
[22] Filed: Jul. 12, 1985
[51] Int. Cl.$^4$ .............................................. C08F 8/06
[52] U.S. Cl. .................................... 525/435; 528/289
[58] Field of Search ......................................... 525/435
[56] References Cited

U.S. PATENT DOCUMENTS 3,983,093  9/1976  Williams, III et al. ............. 428/435
4,115,341  9/1978  Boldebuck et al. ............. 260/33.2 R
4,157,996  6/1979  Boldebuck et al. .................... 528/26
4,433,131  2/1984  Bolon et al. .
4,574,144  3/1986  Yates, III et al. ................... 525/435

Primary Examiner—Joseph L. Schofer
Assistant Examiner—Bernard Lipman
Attorney, Agent, or Firm—Francis T. Coppa; James C. Davis, Jr.; James Magee, Jr.

[57] ABSTRACT

An improved method for preparing cross-linked polymers is disclosed, in which at least one alkyl or alicyclic substituent attached to an aromatic radical in the polymer acts as a functional site for oxidative cross-linking. The polymer may be extruded or solvent-deposited directly onto electrical conductors prior to cross-linking. The polymer film may then be cross-linked when exposed to an oxidizing agent and heated at a temperature within the range from the polymer's glass transition temperature to just below its degradation temperature.

12 Claims, 2 Drawing Figures

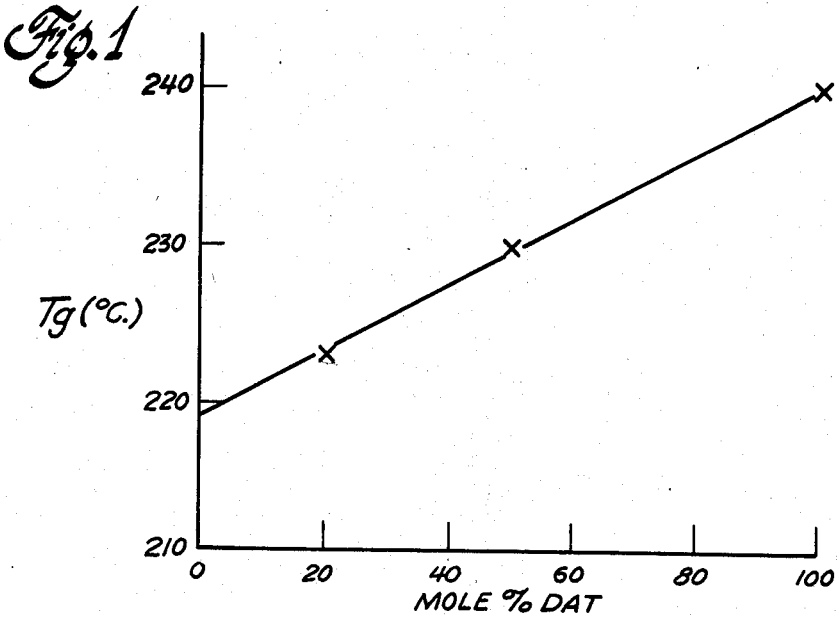
MOLE PERCENTAGE OF DAT vs. GLASS TRANSITION
TEMPERATURE FOR POLYIMIDE COPOLYMERS
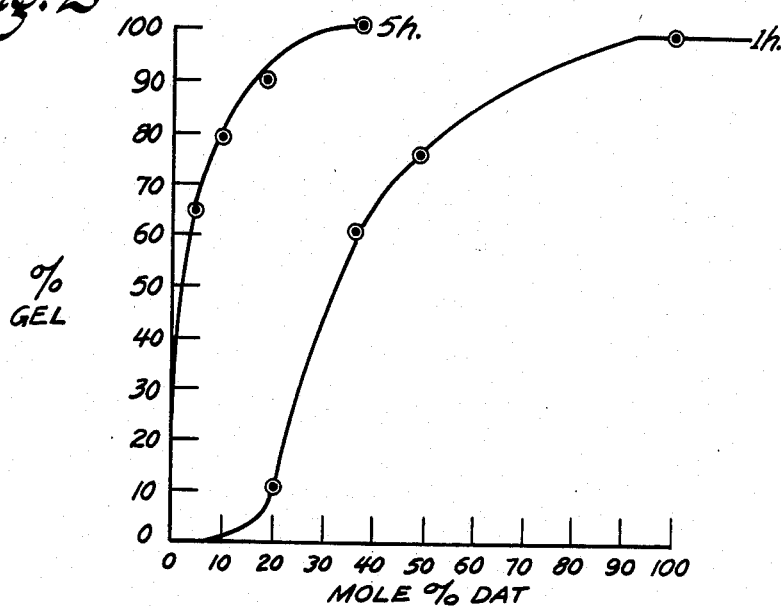
PERCENTAGE OF GEL FORMATION vs. THE MOLE
PERCENTAGE OF DAT FOR POLYIMIDE FILMS
HEATED AT 300° C. FOR 1 HOUR AND FOR 5 HOURS

ALKYL-CONTAINING MONOMERS IN CROSS-LINKABLE POLYIMIDE COMPOSITIONS

BACKGROUND OF THE INVENTION

This invention relates to a method for preparing a cross-linked polymeric composition, and more particularly, it relates to a method for preparing a cross-linked polyimide polymer and to articles formed from the cross-linked polymer.

Polyimide resins, especially polyetherimide resins, are well-known for their use in wire-coating applications. These resins generally provide good solvent resistance and thermal stability when applied to electrical conductors such as magnet wire. One highly regarded polyetherimide resin film used for this type of application is the ULTEM® product of General Electric Company. Although the ULTEM® product can be easily applied to electrical conductors, the increasing use of high-speed extruding and coating systems requires that polymeric compositions cure more quickly and possess greater thermal stability than the prior art compositions. Greater thermal stability is desirable in wire insulation used in certain electrical devices, such as motors and transformers, because these devices frequently function at temperatures greater than the creep point of prior art thermoplastic polyetherimide coatings, thereby causing such coatings to begin to deteriorate, possibly resulting in the failure of the electrical devices.

The problem of high-temperature stability in polyetherimide compositions is addressed in U.S. Pat. No. 3,983,093. U.S. Pat. No. 3,983,093 relates to the copolymerization of more rigid dianhydrides such as pyromellitic dianhydride with 2,2-bis[4-(2,3-dicarboxyphenoxy)phenyl]propane dianhydride (bisphenol A dianhydride or BPADA). Although the use of the more rigid dianhydride enhances the high temperature capabilities of the polymer, the solubility of the polymer in nonpolar solvents may be decreased. Thus, dipolar solvents may be necessary, but these solvents are more difficult to handle because of their increased toxicity.

In U.S. Pat. No. 4,157,996, methylene dianiline was used with BPADA to form a polyetherimide-type coating solution useful as an insulator on copper and aluminum wire. Although these materials have good thermal stability and solvent resistance, it is desirable to provide a process which further improves the thermal stability and solvent resistance of the polyetherimide material.

There is disclosed in U.S. Pat. No. 4,115,341 a process for preparing polyetheramide-acidimide polymers which are based on BPADA and methylene dianiline. Although these polymers exhibit good thermal stability and are suitable for solvent deposition wirecoating methods, it is desirable to provide coatings which exhibit even greater thermal stability and which may be solvent-deposited or extruded in the solventless melt phase onto electrical conductors.

It is therefore an object of this invention to provide a process which improves the solvent resistance of polyimide-type compositions used in wire-coating applications.

It is a further object of this invention to provide an improved process for increasing the thermal stability of polyimide-type compositions without sacrificing the solubility of such compositions in nonpolar solvents.

It is still a further object of this invention to provide a polyimide composition which can be used to coat electrical conductors by either solvent deposition or solventless extrusion.

It is yet another object of this invention to provide a metal conductor having thereon a cross-linked polymer which exhibits improved thermal stability and solvent resistance.

Other objects and advantages of the invention will become apparent as the description thereof proceeds.

SUMMARY OF THE INVENTION

The foregoing objects are achieved by an improved method for preparing cross-linked polymers from a nitrogen-containing polymer containing structural units having the formulas

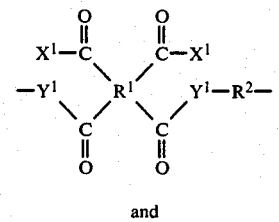

and

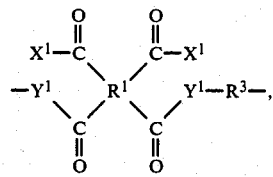

wherein:
each $R^1$ is independently a tetravalent aromatic radical bound to carbonyl groups at two sets of ortho positions;
each of $R^2$ and $R^3$ is a different divalent aromatic hydrocarbon radical containing about 6–20 carbon atoms, a halogenated derivative thereof, or an alkylene or cycloalkylene radical containing about 2–20 carbon atoms; and
in each combination of $X^1$ and $Y^1$ independently, $X^1$ is OH and $Y^1$ is NH or $X^1$ and $Y^1$ taken together are N;
at least one of $R^1$, $R^2$ and $R^3$ being an aromatic radical containing at least one alkyl or alicyclic substituent;
said method comprising the steps of:
(a) contacting said nitrogen-containing polymer with an oxidizing agent; and
(b) heating the polymer at a temperature within the range from its glass transition temperature to just below its degradation temperature.

The structural units (I) and (II) above are derived in part from diamine reactants, and the preferred diamines are meta-phenylenediamine (m-PD) and isomers of diaminotoluene (DAT) in selected proportions. The presence of the alkyl or alicyclic groups attached to an aromatic group on the diamines and/or on the other monomers described below results in an increase in the glass transition temperature of the resulting polyimide polymer. The alkyl groups or alicyclic groups also act as functional sites for the oxidative cross-linking reaction of the polymer.

In one aspect of the present invention, the polymer in its uncross-linked state can be extruded directly onto electrical conductors such as magnet wire. The coated wire is then passed through an oven and heated in air at temperatures within the range from the glass transition temperature of the polymer to a temperature just below its degradation temperature, and cross-linking within the polymer occurs within this temperature range. The resulting cross-linked polymer film exhibits superior thermal stability and improved solvent resistance as compared to prior art polymer resin films.

In another aspect of the present invention, the polymer in its uncross-linked state may be solvent-deposited onto electrical wire by first dissolving the polymer in solvent and then passing the wire through the solution. As the solution is heated in the presence of air, the solvent evaporates and cross-linking occurs.

By the process of the present invention, it has been found that polyimide compositions can be oxidatively cross-linked according to the particular requirements of the surface being coated and according to the particular coating system being utilized. The resulting film has a higher degree of solvent resistance and thermal stability than prior art films due to the cross-linking within the polymer.

BRIEF DESCRIPTION OF THE DRAWINGS

FIG. 1 is a graph depicting glass transition temperature (determined under a nitrogen gas blanket) as a function of the mole percentage of diaminotoluene in an uncross-linked polyimide composition.

FIG. 2 is a graph depicting the percentage of gel formation as a function of the mole percentage of diaminotoluene in a polyimide composition throughout two time schedules.

DETAILED DESCRIPTION OF THE INVENTION

The cross-linked polymers of the present invention are prepared from a nitrogen-containing polymer containing structural units having the formulas

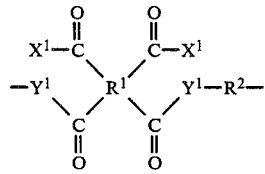

(I)

and

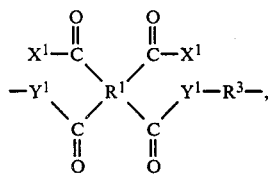

(II)

wherein:
each $R^1$ is independently a tetravalent aromatic radical bound to carbonyl groups at two sets of ortho positions;
each of $R^2$ and $R^3$ is a different divalent aromatic hydrocarbon radical containing about 6-20 carbon atoms, a halogenated derivative thereof, or an alkylene or cycloalkylene radical containing about 2-20 carbon atoms; and
in each combination of $X^1$ and $Y^1$ independently, $X^1$ is OH and $Y^1$ is NH or $X^1$ and $Y^1$ taken together are N;
at least one of $R^1$, $R^2$ and $R^3$ being an aromatic radical containing at least one alkyl or alicyclic substituent.

The nitrogen-containing polymers used in the method of this invention may contain polyamic acid units, in which $X^1$ is OH and the corresponding $Y^1$ is NH, and/or polyimide units, in which $X^1$ and the corresponding $Y^1$ taken together are N. The polyamic acids are principally useful as polyimide intermediates and the most desired products are those in which substantially all $X^1$-$Y^1$ combinations are N.

The $R^1$ value is a tetravalent aromatic radical derived from a tetracarboxylic acid having the formula $R^1(COOH)_4$. Suitable acids of this type include pyromellitic acid, 3,4,3',4'-diphenyltetracarboxylic acid, bis(3,4-dicarboxylphenyl) ketone, bis(3,4-dicarboxyphenyl) sulfide and bis(3,4-dicarboxyphenyl) sulfone. Mixtures of $R^1$ may also be used in the process of the present invention.

The preferred $R^1$ values are those having the formula

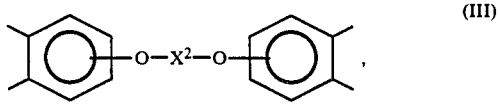

(III)

wherein $X^2$ is a divalent aromatic radical, which may be attached through oxygen to the aromatic rings in the 3- or 4-positions, preferably the 4-positions, with respect to the free valence bonds. Illustrative $X^2$ radicals of this type are derived from such compounds as resorcinol, hydroquinone, 4,4'-dihydroxybiphenyl, 4,4'-dihydroxy-3,3',5,5'-tetramethylbiphenyl, 4,4'-dihydroxydiphenylmethane, 3,4'-dihydroxydiphenylmethane, 2,2-bis(2-hydroxyphenyl)propane, 2,2-bis(4-hydroxyphenyl)propane ("bisphenol A"), 2-(3-hydroxyphenyl)-2-(4-hydroxyphenyl)-propane, 1,1-bis(4-hydroxyphenyl)ethane, 2,2-bis(4-hydroxyphenyl)pentane, 4,4'-dihydroxybenzophenone, bis(4-hydroxyphenyl) ether, bis(4-hydroxyphenyl) sulfide, bis(4-hydroxyphenyl) sulfoxide, bis(4-hydroxyphenyl) sulfone and 3-hydroxyphenyl 4-hydroxyphenyl sulfone.

The preferred $X^2$ values are those having the formulas

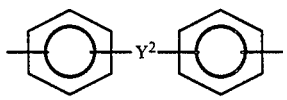

(IV)

and

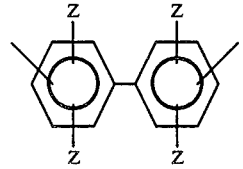

(V)

wherein each Z is independently $CH_3$ or H and $Y^2$ is selected from the group consisting of:

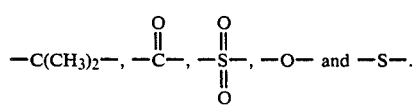

It is to be understood that each of the above formulas may include a wide variety of organic and inorganic substituents attached thereto, such as halogens, nitriles, carboxylic acid groups, carbonyl groups, sulfur-containing groups, and the like.

The $R^2$ and $R^3$ values are as previously defined and may be considered as being derived from diamines of the formulas $R^2(NH_2)_2$ and $R^3(NH_2)_2$. Examples of suitable $R^2$ and $R^3$ values are those in such diamines as
ethylenediamine;
propylenediamine;
trimethylenediamine;
diethylenetriamine;
triethylenetetramine;
heptamethylenediamine;
octamethylenediamine;
2,11-dodecanediamine;
1,12-octadecanediamine;
3-methylheptamethylenediamine;
4,4-dimethylheptamethylenediamine;
4-methylnonamethylenediamine;
2,5-dimethylhexamethylenediamine;
N-methyl-bis(3-aminopropyl)amine;
3-methoxyhexamethylenediamine;
1,2-bis(3-aminopropoxy)ethane;
bis(3-aminopropyl) sulfide;
1,4-cyclohexanediamine;
bis(4-aminocyclohexyl)methane;
m-phenylenediamine;
p-phenylenediamine;
o-phenylenediamine;
4,4'-diaminodiphenylpropane;
4,4-diaminodiphenylmethane;
benzidine;
4,4'-diaminodiphenyl sulfide;
4-4'-diaminodiphenyl sulfone;
4,4'-diaminodiphenyl ether;
1,5-diaminophthalene;
3,3'-dimethylbenzidine;
3,3'-dimethoxybenzidine;
2,4-bis($\beta$-amino-t-butyl)toluene;
bis(p-$\beta$-amino-t-butylphenyl)ether;
4,4'-diaminobenzophenone;
bis(p-$\beta$-methyl-o-aminopentyl)benzene;
1,3-diamino-4-isopropylbenzene;
1,2-bis(3-aminopropoxy)ethane;
m-xylylenediamine;
p-xylylenediamine;
3-methylheptamethylenediamine;
4,4-dimethylheptamethylenediamine;
2,11-dodecanediamine;
3,3-dimethylpropylenediamine;
octamethylenediamine;
3-methoxyhexamethylenediamine;
2,5-dimethylhexamethylenediamine;
2,6-dimethylheptamethylenediamine;
2-methylheptamethylenediamine;
5-methylnonamethylenediamine;
1,4-cyclohexanediamine;
1,12-octadecanediamine;
bis(3-aminopropyl)sulfide;
N-methyl-bis(3-aminopropyl)amine
hexamethylenediamine;
heptamethylenediamine;
nonamethylenediamine;
decamethylenediamine;
bis(3-aminopropyl)tetramethyldisiloxane;
bis(3-aminobutyl)tetramethyldisiloxane, etc.

Methods for the preparation of polyimides and polyamic acids by the reaction of dianhydrides with diamines are known in the art. A somewhat different method, comprising the reaction of a diamine with a bisimide of an amine containing an electron-deficient radical, is disclosed in copending, commonly assigned U.S. application Ser. No. 505,636, filed June 20, 1983, now U.S. Pat. No. 4,578,470, the disclosure of which is incorporated by reference herein. In U.S. application Ser. No. 505,636, there is disclosed a method for preparing a polyimide which comprises reacting at least one diamine with at least one bisimide. Imides are first prepared by reacting amines having the formula $Z-NH_2$ (where Z is a highly electron-deficient group) with various phthalic acid derivatives such as anhydrides. The monoimides are then used to prepare bisimides by various reactions known in the art. Polyimides are then prepared by merely heating the mixture of bisimides and diamines.

In preferred embodiments of the present invention, the nitrogen-containing polymers having structural units I and II are formed by the reaction of diamines with dianhydrides having the formula

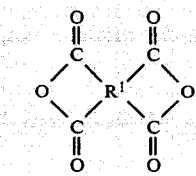 (VI)

wherein each $R^1$ is as described above. Furthermore, where mixtures of dianhydrides are used, it is preferred that at least 80% of the dianhydride mixture includes the $X^2$ value described above wherein $X^2$ conforms to Formula IV and wherein $Y^2$ is $-C(CH_3)_2-$. Dianhydrides of this type include, for example, 2,2-bis[4-(2,3-dicarboxyphenoxy)phenyl]propane dianhydride and 2,2-bis[4-(3,4-dicarboxyphenoxy)phenyl]propane dianydride (BPADA), the latter being the most preferred dianhydride.

Where more rigidity is desired in the nitrogen-containing polymer, at least one rigid dianhydride is used in conjunction with BPADA. The rigid dianhydride may comprise a variety of dianhydride monomers corresponding to Formula VI above, or mixtures of those monomers. In certain embodiments, it is preferred to include up to about 20% by weight of a rigid dianhydride such as pyromellitic dianhydride (PMDA), 4,4'-thio(bis-1,2-benzene dicarboxylic acid anhydride) (SDA) or mixtures thereof. The rigidity of these dianhydrides serves to increase the glass transition temperature ($T_g$) of the polymer, thereby resulting in a polymer which is thermally stable at a higher temperature than conventional polyimides. When these dianhydrides are used to form polymers that are subsequently cross-linked in accordance with the present invention, still larger increases in glass transition temperatures are achieved. Numerous other dianhydrides according to Formula VI above may be included as comonomers in the preparation of the nitrogen-containing polymers.

The use of amounts of BPADA less than 80% by weight is possible when the remainder of the dianhydride mixture comprises various other dianhydrides, such as the rigid dianhydrides discussed above. Amounts of BPADA less than 50% by weight may require modifications in polymerization techniques, such as the use of dipolar aprotic solvents. If these modifications are made, levels of BPADA as low as 1% by weight are suitable for the composition of this invention.

At least two diamines according to the above-described formulas $R^2(NH_2)_2$ or $R^3(NH_2)_2$ may be used in the present invention. The diamines may be either aromatic or aliphatic or both. As indicated above, the $R^2$ and $R^3$ substituents in the structural units (I) and (II) differ. For example, when $R^2$ is derived from an isomeric mixture of DAT, then $R^3$ must be derived from a different diamine, such as meta-phenylenediamine, or vice versa. $R^2$ and $R^3$ cannot be derived from the same diamine in the same nitrogen-containing polymer in the process of the present invention.

It is preferred that $R^2$ or $R^3$ be derived from an isomeric mixture of DAT, and the components of such a mixture are discussed below. DAT is a rigid diamine which increases the glass transition temperature of the polyimide polymer while also acting as a site for oxidative cross-linking. The cross-linking reaction is generally initiated after the polyimide has been fully polymerized, and is described below in further detail. It is preferred to use at least about 50% to about 99% by weight of the isomeric mixture of DAT (based on total diamine weight) to prepare the nitrogen-containing polymers, although levels of the DAT mixture as low as 1% by weight are also suitable. In those instances where a second diamine used in conjunction with the isomeric mixture of DAT is meta-phenylenediamine, the ratio of the isomeric mixture of DAT to meta-phenylenediamine may range from about 99:1 to about 1:99. Higher levels of the DAT mixture increase the glass transition temperature of the polyimide, as shown in FIG. 1, further described below.

In certain preferred embodiments of the present invention, about 75% by weight of the 2,6-isomer of DAT (based on total DAT weight) is used with about 25% of the 2,4-isomer of DAT. The 2,6-isomer of DAT produces a polymer with a higher glass transition temperature than polymers produced from the 2,4-isomer of DAT. However, levels as low as about 1% by weight of the 2,6-isomer would also be effective for the process of this invention, and in fact, the DAT may be comprised solely of either the 2,4-isomer or the 2,6-isomer. In the commercial practice of the invention, an isomeric mixture of about 80% by weight of the 2,4-isomer of DAT and about 20% by weight of the 2,6-isomer of DAT may be used.

A wide range of other diamines or mixtures thereof may be used in conjunction with any of the isomeric mixtures of DAT discussed above. These diamines also generally have the formulas $R^2(NH_2)_2$ or $R^3(NH_2)_2$, as defined above. It is preferred that one of the $R^2$ or $R^3$ radicals be derived from meta-phenylenediamine because it is the preferred diamine to be used in conjunction with the isomeric mixtures of DAT. If a higher $T_g$ for the polymer is desired, meta-phenylenediamine may be used in conjunction with only the 2,6-isomer of DAT, and in that instance, the preferred ratio of 2,6-diaminotoluene to meta-phenylenediamine is from about 70:30 to about 99:1.

In preferred embodiments, one of the $R^2$ or $R^3$ radicals of the diamines discussed above is an aromatic radical containing at least one alkyl or alicyclic substituent. Furthermore, it is preferred that the alkyl or alicyclic substituent be a methyl group since in certain instances, methyl groups allow faster oxidative cross-linking than other substituents. However, it is not necessary for any of the diamines to have an alkyl or alicyclic substituent attached thereto if there is at least one alkyl or alicyclic substituent contained in the aromatic radical of another monomer, such as in one of the dianhydrides. Examples of suitable alkyl or alicyclic substituents attached to any of the aromatic radicals include methyl, ethyl, propyl, pentyl, isopropyl, isobutyl, cyclohexyl, and the like. The alkyl or alicyclic substituents may have a wide variety of organic and inorganic substituents attached thereto, such as halogens, nitriles, carboxylic acid groups, carbonyl groups, sulfur-containing groups, and the like. Alkyl or alicyclic substituents containing longer carbon chains may require a greater amount of time in achieving cross-linking, although higher cross-linking temperatures may be used to reduce the amount of time needed for cross-linking in those instances.

When the alkyl or alicyclic substituent is attached to the aromatic radical on one of the diamines, the solubility of the nitrogen-containing polymer in nonpolar solvents is increased, thereby offsetting the possible loss in solubility incurred when rigid dianhydrides such as PMDA and SDA are incorporated into the system. Thus, the polar solvents normally required for some of the rigid dianhydrides do not have to be used in preparing the polyimide composition.

In preferred embodiments wherein the polyimides and polyamic acids are formed by the reaction of dianhydrides with diamines, typical solution polymerization techniques well-known in the art are used. For example, see U.S. Pat. No. 4,115,341 for a description of typical polymerization processes for similar types of materials. Typically, the dianhydride and diamine monomers described above are combined with a chain-stopper such as phthalic anhydride, a catalyst such as sodium phenylphosphonite, and a chlorinated solvent such as orthodichlorobenzene, under a nitrogen atmosphere. The mixture is then warmed to about 140° C. for about 30 minutes and then allowed to reflux for about 60 minutes as water is removed from the system. The reaction vessels and attachments are then dried. Molecular sieves are then attached to the apparatus, and the mixture is allowed to reflux for about 120 more minutes. After the mixture is diluted with more of the chlorinated solvent, it is then added to a polar solvent such as methanol, and the polymer precipitates. If the polymer is not fully polymerized at this point, it can be dried, filtered, and then further reacted in a helicone mixer until full polymerization is effected.

This method of polymerization is suitable for any combination of the above-mentioned diamine and dianhydride monomers. Modifications of the procedure which remain within the scope of the present invention can easily be made by one skilled in the art. For instance, the viscosity of the polymer prior to cross-linking may be adjusted by varying the level of solvent, depending on the type of coating application desired.

When the above polymerization technique is used to form polyimides derived from DAT, an increase in the $T_g$ of the polyimide is evident as the level of the DAT is increased. FIG. 1 depicts $T_g$ as a function of the mole percentage of DAT in an uncross-linked polyimide composition, wherein meta-phenylenediamine is used in conjunction with the commercial DAT mixture discussed above (80% of 2,4-DAT, 20% of 2,6-DAT), and wherein the dianhydride used is BPADA. The $T_g$'s were determined under a nitrogen gas blanket. It is clear from the curve in FIG. 1 that increasing the level of DAT results in an increase in the $T_g$ of the polyimide. When DAT is excluded from the composition, the $T_g$ is about 219° C., whereas when 50% by weight of DAT is used, the $T_g$ is increased to about 230° C.

Table 1 below demonstrates the additional increase in $T_g$ when more rigid dianhydrides such as PMDA or SDA are added as co-monomers with BPADA. The Control is a polymer containing 100% BPADA/100% meta-phenylendiamine, and it exhibits a $T_g$ of about 218° C. The remainder of the dianhydride mixture in 2–5 consists of BPADA.

TABLE 1

Properties of Various Co-Polymers[a]

| Co-Dianhydride | % DAT[b] | Tg (°C.) |
| --- | --- | --- |
| 1. CONTROL | — | 218 |
| 2. 20% PMDA | — | 233 |
| 3. 20% PMDA | 100 | 269 |
| 4. 20% SDA | — | 226 |
| 5. 20% SDA | 100 | 261 |

[a]Prepared in o-dichlorobenzene.
[b]The DAT mixture contains about 80% of 2,4-diaminotoluene and about 20% of 2,6-diaminotoluene; m-phenylenediamine is the alternative diamine.

When 20% by weight of PMDA is added, the $T_g$ of the polymer is raised to 233° C. When meta-phenylenediamine is replaced by DAT in the PMDA-containing system, the $T_g$ is increased to about 269° C. Similar increases occur in the system which contains SDA, as shown in Table 1.

In one aspect of the present invention, the nitrogen-containing polymer in its uncross-linked state can be extruded directly onto electrical conductors, such as magnet wire, prior to cross-linking of the polymer. Extrusion techniques for this type of coating application are well-known in the art and need not be described in detail. Typically, the solid polymer in its fully-polymerized state is fed into an extruder or injection molding apparatus equipped with a heater. As the polymer is heated to approximately its softening point, it flows through the molding apparatus onto a conductor, e.g. copper wire, which is passing through or adjacent the apparatus at an angle perpendicular to the polymer stream. By this method, the entire surface of the wire is coated, and as the conductor leaves the molding apparatus, the polymer cools and adheres to the wire. The amount of air contacting the polymer during extrusion is generally not sufficient to induce premature oxidative cross-linking. If desired, though, a nitrogen or other inert gas blanket may be situated in the vicinity of the extruder barrel to prevent the entry of air.

In order to study the properties of the polymer composition of the present invention, polymeric material is dissolved in solvent and cast on a glass plate. The films formed on the glass plate are then oxidatively cross-linked on the plate. The film-forming capability of the polymer system is easily adaptable by one skilled in the art for utilization in the extrusion coating techniques described above.

The presence of at least one alkyl or alicyclic substituent contained in an aromatic radical in the nitrogen-containing polymer enables the polymer to be oxidatively cross-linked after being applied to the wire. If the polymer is not contacted with an oxidizing agent either at a temperature below its $T_g$ or at a temperature within the range from its $T_g$ to just below its degradation temperature, the polymer remains thermally stable at the cross-linking temperatures discussed below, and will not undergo oxidative cross-linking. It appears that the exposure of the polymer to the oxidizing conditions described herein causes oxidation of at least some of the alkyl or alicyclic substituents in the polymer. The oxidized substituents are then dehydrogenated to form aldehyde-type groups which condense with free amine functionalities to yield imine groups which form the cross-linking linkages in the polymer.

When the nitrogen-containing polymers are used as wire coating materials as discussed above, the wire may be coated with the uncross-linked polymer and may then be passed through a convection oven having an oxidizing agent therein, such as air. Cross-linking temperatures may range from the glass transition temperature of the polymer to just below its degradation temperature. Typical cross-linking temperatures corresponding to this range are about 225° C. to about 325° C., with the preferred range being about 275° C. to about 320° C. Higher temperatures result in faster cross-linking of the polymer, although increased oven-exposure times can compensate for lower exposure temperatures. The length of time for which the polymers may be exposed to the cross-linking environment may vary widely, depending on film thickness, oven temperature, and the number of free alkyl or alicyclic substituents attached to the polymer. Although the entire polymer may undergo cross-linking if desired, the cross-linking of only the surface region of the polymer may be adequate for excellent solvent resistance in a wire coating. Typically, the coatings require less than about 60 minutes for cross-linking in the surface region to occur upon contact with air when oven temperatures are approximately 320° C. The surface region as broadly defined may be about several tenths of a mil deep in a cured polymer coating having a thickness of about 1.0 mil. It is also possible to delay the oxidative cross-linking step, if desired, for several hours or even several months.

In the preferred method of the present invention, the polymer is contacted with air at the same time the polymer is being heated within the cross-linking temperature range, regardless of whether the polymer is contacted with an oxidizing agent prior to that time. Alternatively, an article may be coated with the uncross-linked polymer and then contacted with an oxidizing agent such as potassium permanganate at room temperature or at any desired temperature below the $T_g$ of the uncross-linked polymer, if desired. The polymer may then be heated by any suitable heat source in an air or inert atmosphere, or in a vacuum, at a temperature from its glass transition temperature to just below its degradation temperature to effect cross-linking in at least the surface region of the polymer. If, in this alternative method, cross-linking of the entire polymer is desired, it may be necessary to utilize only an air atmosphere while heating the polymer within the cross-linking temperature range.

FIG. 2 depicts the percentage of gel formation of a BPADA-containing polyimide polymer as a function of the percentage of DAT contained in the polymer, throughout two heating schedules, wherein the commercial mixture of DAT described above is used (80% of 2,4-DAT and 20% of 2,6-DAT). The percentage of gel formation is an indication of the initiation of oxidative cross-linking occurring in the polymer. During each heating schedule, the amount of cross-linking increases as the level of DAT is increased.

When the cross-linked polymer of the present invention is applied to a metal conductor, it forms an insulating coating having a higher degree of solvent resistance and thermal stability than prior art insulating coatings. The improved properties are due in part to an increase in the $T_g$ of the polymer after cross-linking has occurred. For instance, an uncross-linked polyimide containing BPADA and about 95% of the commercial mixture of DAT has a $T_g$ of approximately 242° C. When cross-linked, the $T_g$ is raised to about 250° C.–252° C., and accordingly, the integrity of the film is maintained at a higher temperature as compared to the uncross-linked film. Thus, there is a decreased probability that wires coated by the above process will become short-circuited when accidently crossed and chafed in a high-temperature environment.

In another aspect of the present invention, the polymer in its uncross-linked state may be solvent-deposited by standard techniques onto electrical wire prior to oxidatively cross-linking the polymer. Typically, the isolated polymer is dissolved in a suitable chlorinated solvent, such as o-dichlorobenzene. The solution is then applied to wire in repeat passes through a standard wire tower apparatus to form a coating thereon. As the coating is heated in air within the temperature range discussed above, the solvent evaporates and oxidative cross-linking occurs. An insulative coating formed by this process has the same improved physical properties as the extruded coating discussed above.

Alternatively, the nitrogen-containing composition discussed above may be partially polymerized to form polyamic acids prior to being solvent-deposited onto a wire conductor. After the composition (in solution) is applied to the wire, the coating may be heated in air within the temperature range discussed above. As the solvent evaporates, oxidative cross-linking and imidization of the polymer occur simultaneously. Again, the insulative coating formed by this process has the improved properties discussed above.

As still another alternative, the polymer may be applied in the solventless melt form to the wire. The wire is drawn through the molten polymer under a nitrogen blanket. The coating on the wire is then oxidatively cross-linked, as discussed above.

EXAMPLE 1

A polyimide was prepared from a diamine mixture containing 20% by weight DAT and 80% by weight metaphenylenediamine in a nitrogen atmosphere using standard solution polymerization techniques. The reactants were 100.98 gms (0.194 mole) of BPADA, 4.89 gms (0.040 mole) of an isomeric mixture of DAT, 17.30 gms (0.160 mole) of meta-phenylenediamine, 1.78 gms (0.012 mole) of phthalic anhydride, 0.0255 gms (15.55 mmol.) of sodium phenylphosphonite, and 250 ml of o-dichlorobenzene. The DAT was a commercial isomeric mixture (Air Products Inc.) composed of about 79.5% of the 2,4-diaminotoluene isomer, about 19.5% of the 2,6-diaminotoluene isomer, and about 1% of other amines and the ortho isomers of DAT. More solvent was added as needed prior to precipitation of the polymer from methanol. Full polymerization was effected in a helicone mixer. The $T_g$ of the uncross-linked polymer was about 223° C.

Polymer films of the above uncross-linked polymer were then cast on glass from o-dichlorobenzene solvent and dried at 220° C. for several hours. The dried films were then placed in a convection oven (which permits circulatory air motion) and heated at different cross-linking temperatures for variable lengths of time. Gel tests for determining the occurrence of cross-linking were carried out by weighing the polymeric samples and then placing them in an extraction head into which chloroform was refluxed. Extraction was carried out for 24 hours.

Table 2 below depicts the presence of oxidative cross-linking in polyimide polymers prepared in Example 1. Three cross-linking temperature/time schedules are shown in Table 2. The Control used for comparison is a polyimide containing 100% BPADA and 100% meta-phenylenediamine. The presence of cross-linking is determined by the solubility of the polymer in chloroform, i.e. when the polymer is insoluble in chloroform, cross-linking has occurred.

TABLE 2

| Oxidative Cross-Linking Test Results | | | |
|---|---|---|---|
| Cross-Linking Temp./Time | 200° C. (18 h.) | 250° C. (18 h.) | 320° C. (1 h.) |
| 1. CONTROL | No | No | No |
| 2. 20% DAT* | No | Yes | Gel |
| 3. 50% DAT* | No | Yes | Yes |
| 4. 100% DAT | No | Yes | Yes |

*m-phenylenediamine is the second diamine.
Yes = Polyimide is cross-linked.
No = Polyimide is not cross-linked.
Gel = Polyimide is partially cross-linked.

From the data in Table 2, it can be seen that the Control does not cross-link at any temperature. Cross-linking also does not occur at 200° C. in any of the polyimides which contain the isomeric mixtures of DAT because 200° C. is below the $T_g$ of each of those polymers. However, cross-linking does occur in the polyimides containing the isomeric mixtures of DAT at 250° C. and at 320° C. because these temperatures are at or above the glass transition temperature of the polyimides.

EXAMPLE 2

A polyimide was prepared as in Example 1 from a diamine mixture comprised of 50% by weight DAT and 50% by weight meta-phenylenediamine. As in Example 1, the commercial mixture of DAT was used. The reactants were 100.98 gms (0.194 mole) of BPADA, 12.22 gms (0.100 mole) of DAT, 10.81 gms (0.100 mole) of meta-phenylenediamine, 1.69 gms (0.011 mole) of phthalic anhydride, 0.0255 gms (15.55 mmol.) of sodium phenylphosphonite, and 250 ml of o-dichlorobenzene. As in Example 1, full polymerization was effected in a helicone mixer. The $T_g$ of the uncross-linked polymer was about 230° C.

Polymer films of the above uncross-linked polymer were then cast on glass and oxidatively cross-linked as in Example 1. The results of the oxidative cross-linking test are shown in Table 2 above.

The process and articles of the present invention have a wide variety of applications. For example, any structure previously coated with a polyimide composition similar to the compositions described above can later be exposed to the oxidative cross-linking conditions of the present invention, thereby further improving the solvent resistance and thermal stability of the coating. Furthermore, the composition of the cross-linkable polymers can be adjusted easily to satisfy various requirements for film hardness, flexibility, and thermal stability. The ability to coat wire with the cross-linkable material by both conventional dip methods and by solventless extrusion further broadens the spectrum of uses for the present invention. These cross-linkable compositions can be used for aviation and automobile applications, for decorative and protective purposes, and as high temperature electrical insulation for motor slot liners, as well as for coil and cable wrappings.

While the invention has been described with respect to preferred embodiments, it will be apparent that certain modifications and changes can be made without departing from the spirit and scope of the invention and, therefore, it is intended that the foregoing disclosure be limited only by the claims appended hereto.

What is claimed is:

1. A method for preparing cross-linked polyimides from a nitrogen-containing polymer containing structural units having the formulas

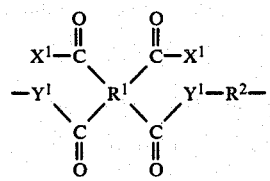
(I)

and

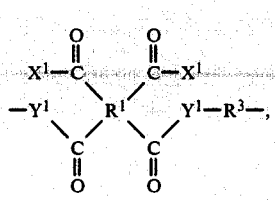
(II)

wherein:
   each $R^1$ is independently a tetravalent aromatic radial bound to carbonyl groups at two sets of ortho positions;
   each of $R^2$ and $R^3$ is a different divalent aromatic hydrocarbon radical containing about 6–20 carbon atoms, a halogenated derivative thereof, or an alkylene or cycloalkylene radical containing about 2–20 carbon atoms, and one of $R^2$ and $R^3$ is derived from an isomeric mixture of diaminotoluene; and
   in each combination of $X^1$ and $Y^1$ independently, $X^1$ is OH and $Y^1$ is NH or $X^1$ and $Y^1$ taken together are N;
   at least one of $R^1$, $R^2$ and $R^3$ being an aromatic radical containing at least one alkyl or alicyclic substituent;
   said method comprising the steps of:
   (a) contacting said nitrogen-containing polymer with an oxidizing agent; and
   (b) heating the polymer at a temperature within the range from its glass transition temperature to just below its degradation temperature.

2. The method of claim 1 wherein the polymer is contacted with the oxidizing agent before heating the polymer.

3. The method of claim 1 wherein the polymer is first contacted with the oxidizing agent at the same time the polymer is being heated.

4. The method of claim 1 wherein $R^1$ has a formula

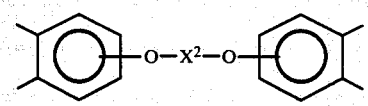

and wherein $X^2$ is a divalent aromatic radical.

5. The method of claim 4 wherein the $X^2$ values are those having the formulas

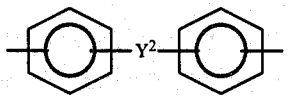

and

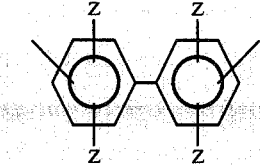

wherein each Z is independently $CH_3$ or H and wherein $Y^2$ is selected from the group consisting of:

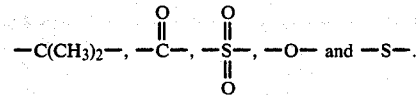

6. The method of claim 1 wherein $R^2$ or $R^3$ is derived from meta-phenylenediamine.

7. The method of claim 1 wherein one of the isomers in the isomeric mixture is 2,6-diaminotoluene.

8. The method of claim 1 wherein the temperature in step (b) is from about 225° C. to about 325° C.

9. The method of claim 8 wherein the temperature in step (b) is from about 275° C. to about 320° C.

10. The method of claim 1 wherein said oxidizing agent is air.

11. The method of claim 1 wherein said oxidizing agent is potassium permanganate.

12. A cross-linked polymer prepared by the method of claim 1.

* * * * *